United States Patent

Weis

[11] 3,886,071
[45] May 27, 1975

[54] FILTER

[75] Inventor: Frank G. Weis, Kansas City, Mo.

[73] Assignee: Ecodyne Corporation, Lincolnshire, Ill.

[22] Filed: Jan. 29, 1973

[21] Appl. No.: 327,381

[52] U.S. Cl. ............... 210/108; 210/119; 210/274; 210/275
[51] Int. Cl. ........................................... B01d 23/26
[58] Field of Search ............ 210/82, 108, 269, 274, 210/275, 106, 111, 119, 416

[56] References Cited
UNITED STATES PATENTS

| | | | |
|---|---|---|---|
| 1,785,480 | 12/1930 | Durdin, Jr. | 210/108 X |
| 3,286,842 | 11/1966 | Jong | 210/275 |
| 3,342,334 | 9/1967 | Soriente et al. | 210/274 X |
| 3,428,177 | 2/1969 | Duff | 210/108 |
| 3,587,861 | 6/1971 | Ross | 210/416 X |
| 3,627,131 | 12/1971 | Goodman et al. | 210/108 X |
| 3,741,390 | 6/1973 | Wallace et al. | 210/108 X |

FOREIGN PATENTS OR APPLICATIONS

| | | | |
|---|---|---|---|
| 2,013,771 | 4/1970 | France | 210/275 |

Primary Examiner—Frank A. Spear, Jr.
Assistant Examiner—Robert G. Mukai
Attorney, Agent, or Firm—Joel E. Siegel; Charles M. Kaplan

[57] ABSTRACT

A filter for treating liquids having a filter compartment separated into an upper inlet chamber and a lower underdrain chamber. An inlet pipe, having a control valve associated therewith, communicates with the inlet chamber. A backwash storage compartment is positioned adjacent the filter compartment. A connecting pipe is provided having a first end in communication with the underdrain chamber and a second end in communication with a backwash pump which permits the passage of filtered liquid from the underdrain chamber therethrough into the backwash storage compartment. A blower is provided to deliver air through an air supply conduit into the underdrain chamber. A level sensing switch, positioned within the inlet chamber, closes off the control valve and activates the blower and pump when the liquid level therein reaches a predetermined level. The first end of the connecting pipe includes a float valve associated therewith which permits the passage of liquid therethrough until the level of liquid within the underdrain chamber drops to the level of the float valve.

6 Claims, 1 Drawing Figure

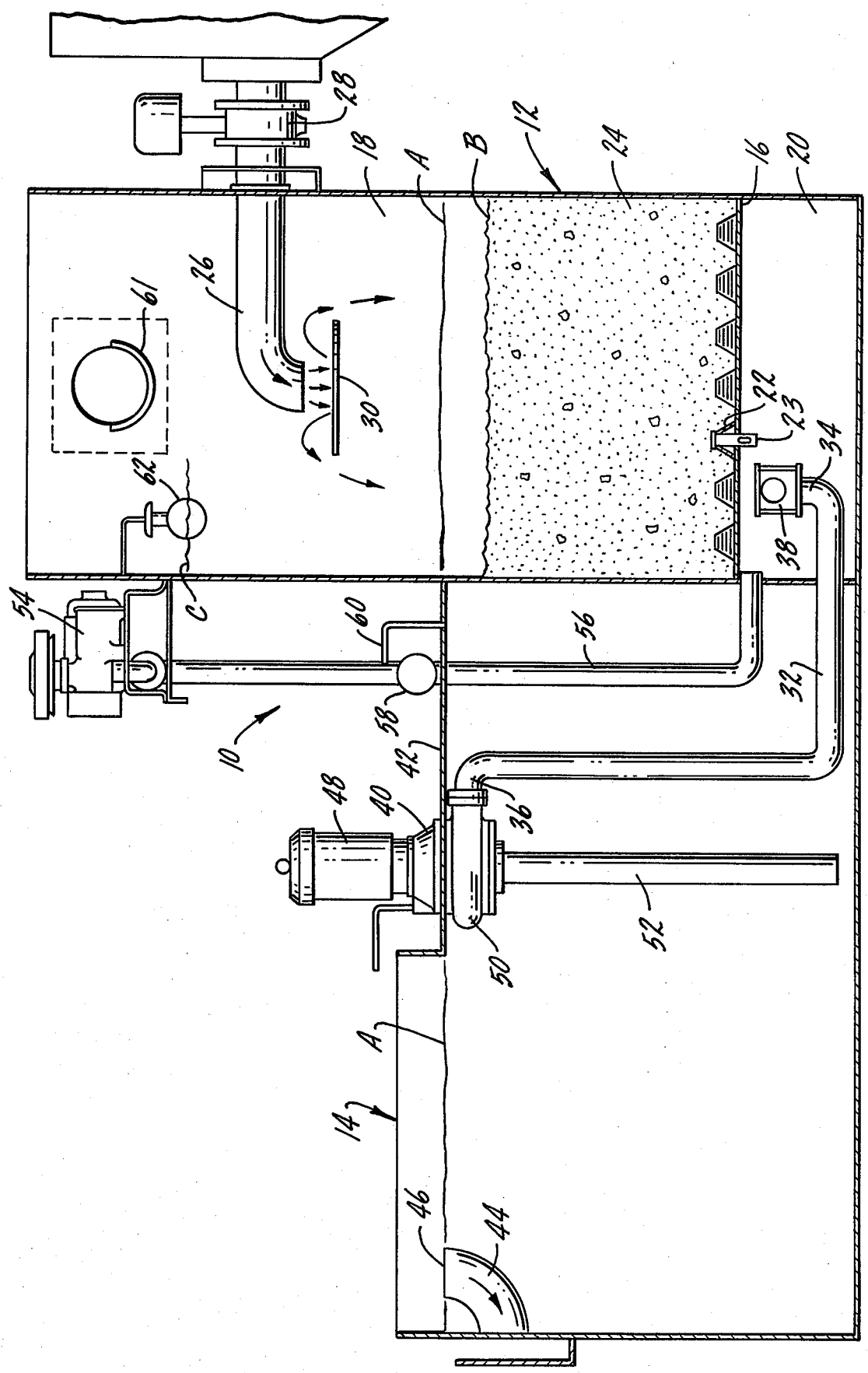

3,886,071

FILTER

BACKGROUND AND SUMMARY OF THE INVENTION

The present invention relates to an improved apparatus for filtering solids from liquids and more particularly to a filter for treating effluent from such as a clarifier in a waste treatment plant which operates automatically with a minimum number of valves and a minimum of tankage and machinery.

Generally, the present invention provides an improved filter which incorporates air scour, backwash and filtering cycles that can be built economically and operated with a small amount of effort. To accomplish this, the valving, piping and the number of pumps and blowers must be held to a minimum. Additionally, the automatic controls should be as simple as possible.

A principal object of the invention is to provide apparatus for filtering solids from liquids which operates automatically with a minimum number of valves and a minimum of tankage and machinery.

A further object is to provide a fully automatic filter apparatus which includes air scour, backwash and filtering cycles that only requires the use of one automatic valve.

A still further object of the invention is to provide such a filter apparatus that does not require the use of a submersible pump.

Another object is to provide a filter apparatus which maintains the liquid level above the filter media.

These and other objects are attained by the filtering apparatus of the present invention which includes a filter compartment containing a filter bed separating it into an upper inlet chamber and a lower underdrain chamber. Liquid to be treated enters the inlet chamber through an automatic control valve and passes through the filter media supported above the filter bed and through strainers into the underdrain chamber. Filtered water passes from the underdrain chamber through a connecting line through a non-submersible backwash pump and then into a backwash storage compartment located adjacent the filter compartment. The filtered liquid then enters an effluent line, positioned within the backwash storage compartment to maintain the liquid above the level of the filter media. When the flow through the filter is high enough and the filter is dirty enough the liquid level above the filter bed will rise to a level which activates a switch positioned within the inlet chamber. This automatically closes the inlet line control valve and starts the air scour blower. The blower communicates with the underdrain chamber to deliver air thereinto through a blower line which includes a check valve to prevent flooding of the blower. The air entering the underdrain chamber passes up through the strainers and scrubs the media and air lifts the foreign material to the liquid surface. During this cycle the underdrain chamber fills with air and closes a float trap associated with the connecting line to prevent air from entering the line which might vent through the pump vent. After a predetermined amount of time the blower shuts down and the backwash pump starts up. This pumps water from the backwash storage compartment through the connecting line into the underdrain chamber. The water then passes through the strainers and the filter media to fill up to a backwash trough for removal from the filter compartment. After a predetermined amount of time the backwash pump stops and the inlet control valve opens to allow the filter to return to normal operation.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawing, which is a cross-sectional view of a filter embodying the features of the present invention.

DESCRIPTION OF A PREFERRED EMBODIMENT

Referring to the drawing, the filter 10 of the present invention includes a filter compartment 12 and a backwash storage compartment 14. In the preferred embodiment shown, the backwash storage compartment 14 is located immediately adjacent the filter compartment 12, although, as those skilled in the art will appreciate, other arrangements may be employed. Mounted within the filter compartment 12 is a false bottom member 16 which divides the compartment into an upper inlet chamber 18 and a lower underdrain chamber 20. Suitable strainer members 22, of the type well known in the art, are mounted on member 16 and permits liquid to pass therethrough. A filter bed 24 of suitable filter media, such as sand, anthracite, and the like, is situated on top of false bottom member 16. An inlet pipe 26, having an automatic influent control valve 28 associated therewith, communicates with an upper portion of the inlet chamber 18. A splash plate 30 is provided within chamber 18 adjacent to the inner end of pipe 26 to distribute the liquid over the filter surface.

Communication between the underdrain chamber 20 and the backwash storage compartment 14 is provided by a connecting pipe 32 having a first end 34 positioned within chamber 20 and a second end 36 positioned within compartment 14. First end 34 has a float type trap valve 38, of conventional construction, associated therewith, which permits the passage of fluid thereinto only when the liquid level within chamber 20 is above the level of valve 38. Second end 36 is connected to the outlet side of a backwash pump 40, whose operation will hereinafter be discussed in further detail.

Backwash storage compartment 14 includes a ceiling section 42 which closes off the half of compartment 14 adjacent to compartment 12. The walls which define the portion of compartment 14 not covered by section 42 extend upward a short distance above section 42 as seen in the drawing. An effluent pipe 44 communicates with an upper portion of the uncovered portion of compartment 14 and includes an inner end 46 which removes filtered liquid from compartment 14. End 46 of pipe 44 is elevated within compartment 14 to a level, indicated at A, approximately 6 inches above the level of the filter media in compartment 12, indicated at B, to maintain a 6 inch water level over the filter bed. Backwash pump 40 is secured to ceiling section 42 with the motor portion 48 positioned thereabove and the volute portion 50 and intake pipe 52 therebelow. Pump 40 is of the type which permits the passage of liquid therethrough when not in an activated or pumping condition. In accordance with the preferred embodiment of the invention, section 42, and pump 40 secured thereto, is at an elevation approximately equal to the elevation of end 46 of pipe 44, indicated at A, so as to retain the liquid level above the filter bed when liquid is removed from compartment 14 by pump 40 after the backwash cycle. This type of pump arrangement permits the use of a regular motor and precludes the necessity of using a submersible pump with its inherent maintenance problems. Second end 36 of pipe 32 is secured to volute 50 of pump 40.

In order that an air scour technique may be employed during the backwash cycle, the preferred embodiment of the present invention shown in the drawing includes an air blower 54 communicating with the underdrain chamber 20 through a blower line or air conduit 56. A check valve 58 and a drain line 60 to the backwash storage compartment 14 are provided in the air conduit 56 to prevent flooding of the blower and to permit the blower to be mounted below the backwash trough 61. Backwash trough 61 is mounted within inlet chamber 18 near the top thereof to receive the backwash water and carry it to waste or storage. A liquid level sensing switch 62, of the type well known in the art, is provided within inlet chamber 18 to initiate the air scour and backwash cycles when the liquid reaches the predetermined level, indicated at C.

In operation during the filtering or service cycle, liquid containing suspended solids, such as sewage, is delivered to the inlet chamber 18 of the filter compartment 12 through inlet pipe 26 and control valve 28. The liquid is directed against splash plate 30 to distribute same over the filter surface as noted by the arrows in the drawing. Under the influence of the pressure head which is built up in inlet chamber 18, the liquid passes downwardly through the filter bed 24, through the strainer members 22, and into the underdrain chamber 20. This filtered liquid then passes to the backwash storage compartment 14 through trap valve 38 into connecting pipe 32, and then through pump 40 and intake pipe 52 into compartment 14. As the liquid level within compartment 14 reaches the level of end 46 of effluent pipe 44, indicated at A, the liquid enters pipe 44 for removal from compartment 14 to service. During the filtering cycle, control valve 28 and trap valve 38 are in their open positions and check valve 58 is in its closed position.

The pressure head in the inlet chamber 18 will eventually reach a level where it is fairly constant, i.e. where it produces enough pressure to permit continuous flow through the filter bed 24. As filtered solids are collected by the filter bed 24, more and more pressure will be required to pass liquid through the filter bed 24, and the pressure head will rise. Eventually, the rising pressure head will reach level C and come into contact with level sensing switch 62. When this occurs, control valve 28 closes preventing the passage of fluids through inlet pipe 26 and air scour blower 54 is actuated opening check valve 58 to deliver air through line 56 into chamber 20. The air passes up through air metering tubes 23 on strainers 22 through the filter media of bed 24. This scrubs the media and air lifts all foreign material to the liquid surface. During this cycle, the air entering chamber 20 is of a sufficient head to force the water above trap valve 38 through connecting pipe 32 into backwash storage compartment 14, at which point trap valve 38 closes preventing air from entering pipe 32 into pump 40. This occurs because the head of water above strainer members 22 is greater than the head of water in chamber 20 and there is also a head loss through the strainer members 22. After about 5 minutes of air scour, the blower 54 is shut off by a suitable timer (not shown), and the backwashing cycle is initiated.

Backwash pump 40 starts up and pumps backwash liquid from compartment 14 consecutively through pipe 52, volute 50, pipe 32 and trap valve 38 into chamber 20. The backwash liquid passes through strainer members 22 and the filter bed 24 to fill up to backwash trough 61. The liquid then overflows this trough and is carried out to waste or storage by suitable piping (not shown). This backwash cycle is timed to last about 5 minutes by a suitable timer (not shown). At the end of the backwash cycle, the pump 40 stops and inlet control valve 28 is opened to allow the filter to return to normal operation.

Particular attention should be made to the unique space relationships of the component parts of the above described filter. The elevation of end 46 of effluent pipe 44 is above the top of filter bed 24 to always maintain the water level in chamber 18 above bed 24. The elevation of pump 40 is such that volute 50 is below the liquid level indicated at A and, therefore, remains full of water and always primed. This permits the use of a standard motor and makes it possible to preclude the use of a submersible pump. The pump 40 elevation is also such that when compartment 14 is pumped down during the backwash cycle or upon start up of the pump, the liquid level to pass through the pump will keep the liquid level above the filter bed 24.

Obviously, many modifications and variations of the invention, as hereinabove set forth, may be made without departing from the spirit and scope thereof, and it is intended to cover in the appended claims all such modifications and variations as fall within the true spirit and scope of the invention.

What is claimed is:

1. A filter for treating liquids, comprising: a filter compartment having a filter bed separating it into an upper inlet chamber and a lower underdrain chamber; an inlet pipe, having a control valve means associated therewith, communicating with said inlet chamber; a backwash storage compartment positioned adjacent said filter compartment; a connecting pipe having a first end extending into said underdrain chamber and a second end in communication with a backwash pump means; said pump means constructed and arranged to permit the flow of filtered liquid from said underdrain chamber through said connecting pipe to pass directly therethrough into said backwash storage compartment; blower means for delivering air through an air supply conduit into said underdrain chamber; control means including a level sensing switch means positioned within said inlet chamber, said control means constructed and arranged for sequentially closing said control valve means, activating said blower means for a period of time, activating said pump means for a period of time and reopening said control valve means, when the liquid in the inlet chamber reaches a predetermined level; said first end of said connecting pipe includes a float valve means associated therewith which permits the passage of liquid therethrough until the level of liquid within said underdrain chamber drops to the level of said float valve means; said air supply conduit communicates with said underdrain chamber at a level above said float valve means such that the air entering said underdrain chamber forces liquid within said chamber through said float valve means and said connecting pipe into said backwash storage compartment until the level drops to the level of said float valve means; and an effluent pipe associated with said backwash storage compartment for removal of filtered liquid therefrom to service.

2. The invention as defined in claim 1 wherein said air supply conduit includes check valve means associated therewith to prevent the passage of liquid from said underdrain chamber towards said blower means.

3. The invention as defined in claim 1 wherein the elevation of the end of the said effluent pipe within said backwash storage compartment is above the elevation of said filter bed within said filter compartment so as to maintain a liquid level above said filter bed.

4. The invention as defined in claim 3 further including a backwash trough means positioned within said inlet chamber above said switch means for removal of backwash liquid from said filter compartment.

5. The invention as defined in claim 4 including a splash plate positioned within said inlet chamber adjacent said inlet pipe for distributing the liquid over said filter bed.

6. The invention as defined in claim 3 wherein said backwash storage compartment includes a ceiling section covering a portion thereof at an elevation substantially equal to the elevation of said end of said effluent pipe positioned therein and said pump means includes a motor portion mounted above said ceiling section and a volute portion mounted immediately below said ceiling section so as to maintain a liquid level above said filter bed and prevent said pump means from losing prime.

* * * * *